(12) United States Patent
Glaser et al.

(10) Patent No.: US 6,524,497 B1
(45) Date of Patent: Feb. 25, 2003

(54) ICE STORAGE ELEMENT WITH THICKENED ICE STORAGE MEDIUM

(75) Inventors: Peter Glaser, München (DE); Albrecht Otte, Tutzing (DE); Andreas Ludwig, Penzberg (DE)

(73) Assignee: Webasto Thermosysteme GmbH, Stockdorf (DE)

( * ) Notice: Subject to any disclaimer, the term of this patent is extended or adjusted under 35 U.S.C. 154(b) by 0 days.

(21) Appl. No.: 09/389,077

(22) Filed: Sep. 2, 1999

(30) Foreign Application Priority Data

Sep. 2, 1998 (DE) .......................... 198 39 993

(51) Int. Cl.⁷ .............................. C09K 3/18; C09K 5/00
(52) U.S. Cl. .............................. 252/73; 252/70; 252/71; 252/76; 252/77; 252/78.1
(58) Field of Search .............................. 252/73, 70, 76, 252/77, 78.1, 71

(56) References Cited

U.S. PATENT DOCUMENTS

| | | | | |
|---|---|---|---|---|
| 2,677,664 A | * | 2/1954 | Telkes | 252/70 |
| 3,703,088 A | * | 11/1972 | Moorhead | 62/430 |
| 3,986,969 A | * | 10/1976 | Telkes | 252/70 |
| 4,292,189 A | * | 9/1981 | Chen | 252/70 |
| 4,404,820 A | * | 9/1983 | Romaine | 62/530 |
| 4,434,065 A | * | 2/1984 | Davis et al. | 252/75 |
| 4,689,164 A | * | 8/1987 | Ames | 252/70 |
| 4,770,804 A | * | 9/1988 | Hentschel et al. | 252/75 |
| 5,140,824 A | * | 8/1992 | Hunt | 62/59 |
| 5,389,275 A | * | 2/1995 | Ames | 252/70 |
| 5,882,542 A | * | 3/1999 | Saita et al. | 252/70 |

FOREIGN PATENT DOCUMENTS

DE 35 31 158 3/1987

* cited by examiner

Primary Examiner—Yogendra N. Gupta
Assistant Examiner—D G Hamlin
(74) Attorney, Agent, or Firm—Nixon Peabody LLP; David S. Safran

(57) ABSTRACT

An ice storage element (28), especially for the auxiliary air conditioning system of a motor vehicle, with a hollow body for forming at least one storage space (34) for an ice storage medium (36) which is liquid in the thawed state and which can be brought into heat-conductive connection with a refrigerant. The ice storage medium (36) contains a thickening agent to suppress sloshing of the ice storage medium (36) in the thawed state and to ensure freezing of the ice storage medium (36) in the form of a slush.

10 Claims, 2 Drawing Sheets

ICE STORAGE ELEMENT WITH THICKENED ICE STORAGE MEDIUM

BACKGROUND OF THE INVENTION

1. Field of the Invention

The invention relates to an ice storage element, especially for the auxiliary air conditioning system of a motor vehicle, with a hollow body for forming at least one storage space for an ice storage medium which is liquid in the thawed state and which can be brought into heat-conductive connection with a refrigerant.

2. Description of Related Art

Conventional ice storage elements of the above described type are provided with complex, and thus expensive, volume equalization elements, for example, of rubber or plastic, in order to ensure volume compensation of the ice storage medium which expands in a phase transition, e.g., freezing. The disadvantage in the known ice storage elements of the type under consideration is, moreover, that the thawed ice storage medium within the storage space of the ice storage element produces a sloshing noise while driving which is a nuisance, since it is perceived by the driver or passenger when the storage element is located in or directly against the passenger compartment.

Furthermore, an ice storage element known from published German Patent Application DE 35 31 158 A1 has a housing formed of a hollow polyethylene section into which metallic refrigerant pipelines are inserted and fixed relative to the walls by additional holding parts. Heat transfer from the cold storage medium within the housing to the air flowing past externally is poor due to the plastic housing. The refrigerant pipelines must be secured with additional components in a complex manner, due to which such an ice storage element is expensive to manufacture.

SUMMARY OF THE INVENTION

Therefore, the primary object of this invention is to devise a ice storage element which uses simple and economical means to withstand expansion of the ice storage medium in a phase transition/freezing without damage and which has an ice storage medium which does not produce sloshing noise in the thawed state.

This object is achieved by the ice storage medium containing a foaming or thickening agent in a quantity and quality such that sloshing of the ice storage medium in the thawed state is suppressed and freezing of the ice storage medium in the form of slush is ensured during at least one phase of volume expansion.

In other words, in accordance with the invention, the properties of the ice storage medium are modified such that, in the installed state, a foamy or gel-like consistency develops which prevents sloshing motion of the thawed medium. Moreover, the property of the ice storage medium is changed by the added foaming agent or thickening agent such that during freezing, i.e., in the transition from the liquid to the solid state, a slush is formed which ensures uniform expansion of the ice storage medium during freezing so that the wall of the storage space of the ice storage element is uniformly loaded and can withstand the volume expansion of the ice storage medium which is freezing. The slush which forms is comparable to crusted snow or finely crushed ice in terms of consistency.

Except for an air cushion which is conventionally provided in the storage space of the ice storage element, no additional volume equalization element is necessary by means of the measure according to the invention to freeze and thaw the ice storage medium in the closed, rigid storage container which forms the storage space. In addition, sloshing noise is reliably suppressed because the thawed ice storage medium is foamy or viscous such that it is too inert to slosh.

Advantageously, a water-based ice storage medium is used. The thickener added to the ice storage medium can, for example, be a gelling agent.

The thickening agent or gelling agent can be any known agent with this property which is matched to the ice storage medium used, which is, for example, preferably water-based. Advantageously, an inorganic agent with thickening or gelling properties is used as the thickening agent or gelling agent. Alternatively, an organic thickening agent can be used, for example, in the form of a polymer which is capable of swelling or in the form of a biological thickening agent.

Advantageously, the thickening agent can also be present in the form of a mixture of different thickening additives and/or foaming agents in order to acquire the desired consistency of the ice storage medium.

In the following the invention is detailed by way of example using the drawings.

DETAILED DESCRIPTION OF THE INVENTION

Figure 1:
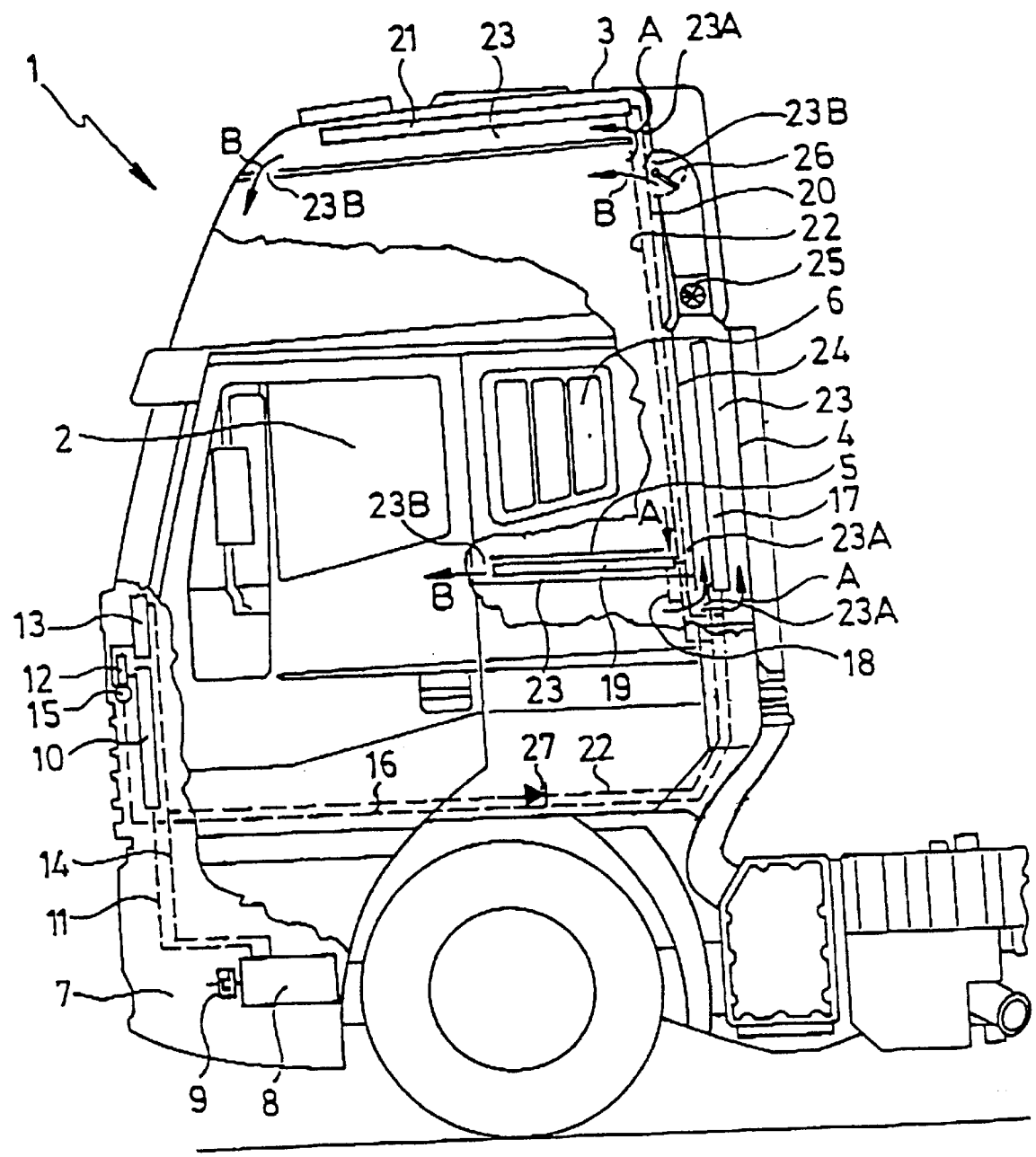
FIG. 1 is a schematic, partially broken away view of a cab of a truck with a compression refrigeration system and several ice storage units.

In the embodiment in FIG. 1, part of a truck 1 is shown in which, within the cab 2, the vehicle interior is formed. The cab 2 is bordered to the top by the roof 3 and to the back by the rear wall 4. Within the rear part of the cab there is a horizontal partition 5 as is conventionally provided as a reclining surface for partitioning of the sleeping cove in a long haul truck in which the rear part of the cab 2 is made as a sleeping compartment 6.

In the engine compartment 7 of the truck 1, there is a compressor 8 which can be connected via a V-belt by a magnetic clutch 9 to a vehicle drive motor which is not shown. The compressor 8 is incorporated into a first refrigerant loop, its being connected to an expansion element via a feed line 11 via a condenser 10, a collector 12 and a first evaporator 13. The refrigerant which circulates in the first refrigerant loop is returned from the first evaporator 13 via a return line to the compressor 8.

Between the collector 12 and the first evaporator 13, there is a reversing valve 15 in which a branch feed line 16 which belongs to a second refrigerant loop branches off from the feed line 11. One or more ice storage units are integrated into this second refrigerant loop and they each include a second evaporator with an expansion element and an ice storage which surrounds it. The first ice storage unit 17 is located in the area of the rear wall 4 of the truck 1. The refrigerant which flows via the branch feed line 16 can be routed via a branch line 18, optionally by means of another reversing valve which is not shown, to a second ice storage unit 19 and a third ice storage unit 21. The second ice storage unit 19 is located in the horizontal partition in the area of the sleeping compartment 6.

There is a third ice storage unit 21 in the area of the roof 3. It is connected via another branch line 18 to the refrigerant branch feed line 16. The ice storage units 17, 19 and 21 are connected to a common return line 22 which, for its part, is connected to the refrigerant return line 14 to the compressor 8. A return valve 27 located in the return line 22 thus prevents backflow of refrigerant gas to the ice storage units 17, 19, and 21 and condensation there.

The ice storage unit 17 is located in a receiving space 23 which is formed by the rear wall 4 of the cab 2 and an intermediate wall 24 located a distance in front of it. Selectively, the ice storage unit can also be inserted into a cutout of the rear wall. Likewise, the ice storage unit 21, which is provided optionally or alternatively in the roof area, and another ice storage unit 21, which is provided optionally or alternatively in the area of the horizonal partition 5, are each located in a receiving space 23 which is formed by the double walls.

The receiving spaces 23 are each connected by an inlet 23A and an outlet 23B to the cab 2, such that air flow can take place through the doubled-walled receiving space 23. This through air flow which takes place either by convection as a result of temperature-induced density differences of the air in the cab 2 or forced by a fan 25 which is optionally provided can be controlled by a shutoff device 26. The shutoff device 26 is made, for example, as a swinging flap which is shown, by way of example, on the top end of the receiving space 23 for the ice storage unit 17. The flap can be actuated manually or by motor and can be replaced by other corresponding shutoff devices, such as movable screens or slides. Even if this is not shown in FIG. 1, it goes without saying that the other receiving space 23 for ice storage units 19 and 21 can each be equipped with a corresponding shutoff device and/or a fan. Air flows through the inlet 23A in the direction shown by arrow A into the receiving space 23, is routed past the respective ice storage unit 17, 19 or 21, and in doing so, is cooled and leaves the receiving spaces 23 as cooled air in the direction toward the cab 2 through the outlet openings 23B as indicated by the arrow B.

The system is preferably designed such that the compressor 8 has enough power to make available not only enough cold for the first evaporator 13 for normal cooling of the cab 2 while driving even with a high demand for cold during operation of the engine, but in addition to charge one or more of the ice storage units 17, 19, 21 by conversion of the storage medium into ice so that, during a subsequent stop, the cab 2 can be cooled by simple air flow through the respective receiving spaces 23. This ensures that the driver finds himself in a pleasant climate in the cab 2 during rest stops or sleeping stops even in hotter countries.

Figure 2:
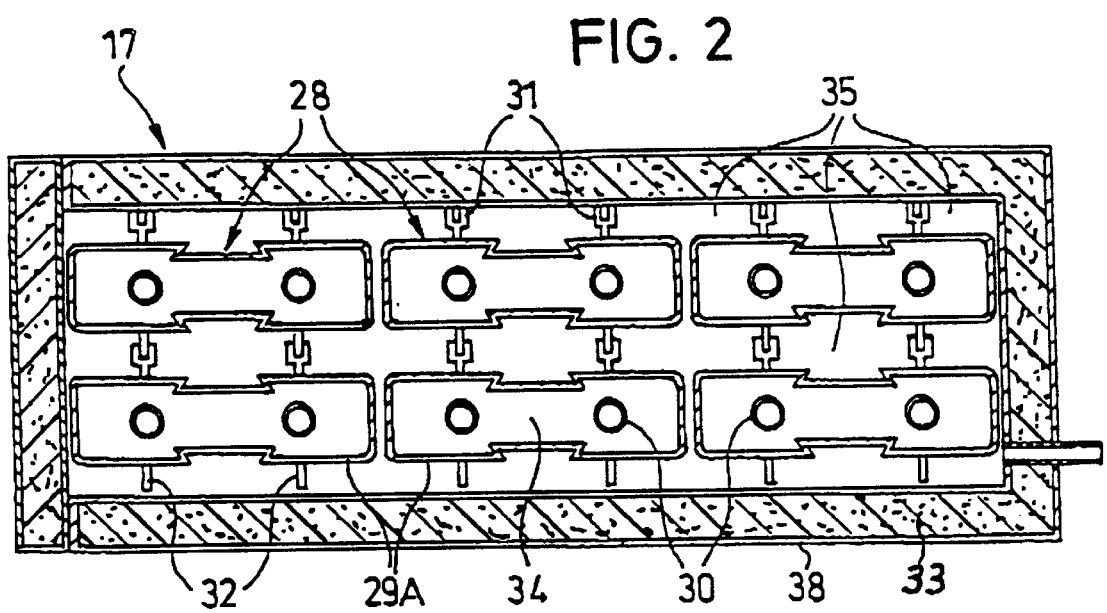
FIG. 2 is a cross-sectional view through an ice storage module with several ice storage elements.

FIG. 2 shows one of the ice storage units 17, 19, 21 in cross section. While the reference number 17 is used, the following comments apply to units 19 and 21 as well. Within a surrounding housing outside wall 38 and an insulating layer 47, in the illustrated embodiment, there are a total of six ice storage elements 28 next to one another with an outside wall bordered by an elongated profile body 29A. The profile body is preferably produced as an extruded profile of lightweight metal, for example, aluminum, and as required, can be cut to the required length. In the cross section of the profile body 29A, two refrigerant pipes are integrated through which refrigerant flows from the branch feed line 16 to the ice storage units, and thus, to the ice storage elements 28 located therein. Within an ice storage unit 17, 19, 21, the ice storage elements 28 are connected in series and/or in parallel in terms of flow by pipe bends which are not shown and which are located in the area of the faces.

The profile bodies 29A have two fork-shaped ribs 31 on the outside wall and bridge-shaped ribs 32 on the opposite wall. In this case, there is a receiving groove formed on the front end of a fork-shaped rib 31 for holding a bridge-shaped rib 32 of an adjacent ice storage element 28. Modular ice storage units of any size can be assembled from any number of ice storage elements 28 in a self-supporting structure by the form-fit engagement of the ribs 31 and 32. In this case, in the area of the ribs 31 or 32, there can be additional connecting elements, such as clips, transverse screws or beads of cement.

Further details of the construction of such ice storage units can be obtained by reference to commonly-owned, co-pending U.S. patent application Ser. No. 09/149,293, which is hereby incorporated by reference.

According to the invention, as the cold storage medium in the ice storage elements 28, a water-based storage medium is used to which a thickening agent or a mixture of thickening agents, preferably a gelling agent, is added, in a quantity and quality such that, when the ice storage medium thaws, it is ensured that sloshing noise is suppressed as the vehicle or truck is driving because the ice storage medium is correspondingly thick. In addition, according to the invention, the thickening of the ice storage medium is achieved by means of the added thickening agent such that, when the ice storage medium is frozen, i.e., in the freezing transition phase, a slush forms first which ensures uniform expansion of the ice storage medium during the freezing process, and thus, uniform loading of the receiving space of the ice storage element.

The substances explained in the following embodiments have proven to be suitable storage media.

EXAMPLE 1

A mixture of from 4 to 7%, preferably 5.87% fatty alcohol C-10, for example, 1-decanol as is available from Sigma Aldrich, 89555 Steinheim, Germany, optionally, 0.01 to 0.05%, preferably 0.03% tenside, 4 to 9 per mil, preferably 6.5 per mil of a polymer with the ability to swell, such as Favorpac 300 which is available from Chemische Fabrik Stockhausen, 47805 Krefeld, Germany, and the remainder de-ionized water.

EXAMPLE 2

Mixture of roughly 15 to 22%, preferably 20% dialcohol, 4 to 6%, preferably 5% highly foaming special tenside, remainder de-ionized water.

While in example 1 the polymer with the ability to swell provides for a slushy structure of the frozen substance which is gel-like in the thawed state, the substance in the second example is highly foamy in the thawed state and in the frozen-state is similar to crusted snow.

EXAMPLE 3

Mixture of:
  2 to 2.3%, preferably 2.17% polyvinyl alcohol,
  0.3 to 0.5%, preferably 0.39% borax,
  0.15 to 0.26%, preferably 0.21% biocide and as the remainder de-ionized water.

The substance in Example 3 is highly viscous (gel-like) in the thawed state and in the phase transition into the frozen state is like crusted snow.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Ice storage element for an auxiliary air conditioning system of a motor vehicle, with a hollow body for forming at least one storage space for a gel-like ice storage medium which is liquid in a thawed state; wherein the ice storage medium contains a foaming in a quantity and composition sufficient for suppressing sloshing of the ice storage medium in the thawed state and for ensuring formation of a slush of the ice storage medium during at least one phase of volume expansion during freezing.

2. Ice storage element as claimed in claim 1, wherein the ice storage medium is a water-based medium.

3. Ice storage element as claimed in claim 1, wherein a tenside is used as the foaming agent.

4. Ice storage element as claimed in claim 3, wherein the ice storage medium contains a mixture of roughly 15 to 22% dialcohol, 4 to 6% highly foaming special tenside and the remainder de-ionized water.

5. Ice storage medium as claimed in claim 4, wherein the percentage of dialcohol is 20% and the percentage of highly foaming special tenside is 5%.

6. Ice storage element as claimed in claim 1, wherein the ice storage medium contains a mixture of
   2 to 2.3% polyvinyl alcohol,
   0.3 to 0.5% borax,
   0.15 to 0.26% biocide, and as the remainder, de-ionized water.

7. Ice storage medium as claimed in claim 6, wherein the percentage of polyvinyl alcohol is 2.17%, wherein the percentage of borax is 0.39%, and wherein the percentage of biocide is 0.21%.

8. Ice storage element for an auxiliary air conditioning system of a motor vehicle, with a hollow body for forming at least one storage space for a gel-like ice storage medium which is liquid in a thawed state; wherein the ice storage medium contains a thickening agent in a quantity and composition sufficient for suppressing sloshing of the ice storage medium in the thawed state and for ensuring formation of a slush of the ice storage medium during at least one phase of volume expansion during freezing; wherein the ice storage medium is a water-based medium; wherein the thickening agent is an organic gelling agent; wherein the thickening agent is a polymer additive with the ability to swell; and wherein the ice storage medium contains a mixture of 4 to 7% fatty alcohol C-10, 4 to 9 per mil of said polymer additive with the ability to swell, and the remainder de-ionized water.

9. Ice storage medium as claimed in claim 8, wherein the percentage of fatty alcohol C-10 is 5.87%; wherein amount of polymer with the ability to swell is 6.5 per mil; and wherein the ice storage medium also contains 0.01 to 0.05% tenside.

10. Ice storage element for an auxiliary air conditioning system of a motor vehicle, with a hollow body for forming at least one storage space for a gel-like ice storage medium which is liquid in a thawed state; wherein the ice storage medium contains a foaming or thickening agent in a quantity and composition sufficient for suppressing sloshing of the ice storage medium in the thawed state and for ensuring formation of a slush of the ice storage medium during at least one phase of volume expansion during freezing; the thickening agent is an organic polymer additive; wherein the thickening agent is an organic polymer additive with the ability to swell; and wherein the ice storage medium contains a mixture of 4 to 7% fatty alcohol C-10, 4 to 9 per mil of said polymer additive with the ability to swell, and the remainder de-ionized water.

* * * * *